United States Patent
Shin et al.

(10) Patent No.: US 9,672,654 B2
(45) Date of Patent: Jun. 6, 2017

(54) METHOD AND APPARATUS FOR ACCELERATING RAY TRACING

(71) Applicant: Samsung Electronics Co., Ltd., Suwon-si (KR)

(72) Inventors: Young-sam Shin, Hwaseong-si (KR); Won-jong Lee, Seoul (KR); Jae-don Lee, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 85 days.

(21) Appl. No.: 14/260,525

(22) Filed: Apr. 24, 2014

(65) Prior Publication Data
US 2015/0091895 A1  Apr. 2, 2015

(30) Foreign Application Priority Data
Oct. 2, 2013  (KR) .................. 10-2013-0118130

(51) Int. Cl.
*G06T 15/06*  (2011.01)
(52) U.S. Cl.
CPC .................... *G06T 15/06* (2013.01)
(58) Field of Classification Search
CPC ..................................... G06T 15/06
See application file for complete search history.

(56) References Cited

U.S. PATENT DOCUMENTS

| 7,676,633 | B1 | 3/2010 | Fair et al. | |
|---|---|---|---|---|
| 2008/0049017 | A1* | 2/2008 | Shearer | G06T 15/06 345/421 |
| 2008/0074418 | A1 | 3/2008 | Shearer | |
| 2008/0088619 | A1* | 4/2008 | Shearer | G06T 15/06 345/420 |
| 2009/0128562 | A1* | 5/2009 | McCombe | G06T 15/06 345/427 |
| 2010/0060637 | A1* | 3/2010 | Shearer | G06T 15/06 345/426 |
| 2010/0328310 | A1* | 12/2010 | Peterson | G06T 15/06 345/426 |
| 2012/0081368 | A1* | 4/2012 | Park | G06T 15/005 345/426 |
| 2014/0098086 | A1* | 4/2014 | Burley | G06T 15/06 345/419 |

FOREIGN PATENT DOCUMENTS

| EP | 0 817 067 A2 | 1/1998 |
|---|---|---|
| JP | 2008-262493 A | 10/2008 |
| KR | 10-2012-0019720 A | 3/2012 |
| KR | 10-2012-0033585 A | 4/2012 |

* cited by examiner

*Primary Examiner* — Daniel Hajnik

(57) ABSTRACT

Provided is a method of accelerating ray tracing. The method includes extracting characteristics of an input ray at a ray scanner, determining a ray with characteristics similar to that of the input ray based on comparing characteristics of the input ray with characteristics of rays used in previous renderings, and conducting a set up for ray tracing of the input ray based on a ray tracing of the determined ray.

30 Claims, 10 Drawing Sheets

METHOD AND APPARATUS FOR ACCELERATING RAY TRACING

RELATED APPLICATIONS

This application claims the benefit under 35 USC 119(a) of Korean Patent Application No. 10-2013-0118130, filed on Oct. 2, 2013, in the Korean Intellectual Property Office, the entire disclosure of which is incorporated herein by reference for all purposes.

BACKGROUND

1. Field

The present disclosure relates to methods and apparatuses for rendering by ray tracing.

2. Description of Related Art 3D rendering refers to image processing whereby 3D object data is synthesized into an image viewed at a given viewpoint of a camera. Ray tracing refers to a process of tracing a point where scene objects and a ray intersect. Ray tracing includes traversal of an acceleration structure and an intersection test between a ray and a primitive. In the traversal and the intersection test, a large number of computations and a broad memory bandwidth are needed. Thus, it is desirable to reduce the number of computations and the bandwidth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect there is provided a method of accelerating ray tracing including extracting characteristics of an input ray at a ray scanner, determining a ray with characteristics similar to that of the input ray based on comparing characteristics of the input ray with characteristics of rays used in previous renderings, and conducting a set up for ray tracing of the input ray based on a ray tracing of the determined ray.

The conducting of the set up may include conducting the set up by loading a result of ray tracing of the determined ray in a cache.

The conducting of the set up may include conducting the set up by updating properties of the result of the ray tracing of the determined ray that is stored in the cache.

Properties of the ray tracing of the determined ray may be stored in a traversal (TRV) cache or an intersection test (IST) cache, and the properties are updated based on a ray tracing of the input ray.

The extracting of the characteristics may include extracting a viewpoint and a direction of the input ray, and the determining of the ray with similar characteristics may include determining the ray based on comparing a viewpoint or a direction of the input ray with a viewpoint or a direction of the rays used in previous renderings to determine a ray having a viewpoint and direction closest to the viewpoint and the direction of the input ray.

The conducting of the set up for ray tracing may include updating a flag of the TRV cache so that a result of the ray tracing of the determined ray is maintained in the TRV cache, in response to a result of ray tracing of the determined previous ray being stored in a traversal (TRV) cache, and loading the result of the ray tracing of the determined ray to the TRV cache, in response to a result of ray tracing of the determined ray not being stored in the TRV cache.

The conducting of the set up for ray tracing may include updating a flag of the IST cache so that a result of the ray tracing of the determined ray is maintained in the IST cache, in response to a result of ray tracing of the determined ray being stored in an intersection test (IST) cache, and loading the result of the ray tracing of the determined ray to the IST cache, in response to the result of ray tracing of the determined ray not being stored in the IST cache.

The conducting of the set up for ray tracing may include transferring a result of ray tracing stored in an traversal (TRV) cache or an intersection test (IST) cache to a preliminary cache.

The method may include controlling an order of traversal of an acceleration structure, at a traversal (TRV) unit, based on the ray tracing of the determined ray.

The method may include controlling an order of an intersection test, at an intersection test (IST) unit, based on the ray tracing of the determined ray.

In another general aspect there is provided a ray tracing apparatus including a history database (DB) configured to stores characteristics and results of ray tracing of rays used in previous rendering, a ray scanner configured to extract characteristics of an input ray, and a data manager configured to determine a ray with characteristics similar to that of the input ray based on comparing characteristics of the input ray with characteristics of the rays used rays in previous rendering, and to conduct a set up for ray tracing of the input ray based on ray tracing of the determined ray.

The data manager may be further configured to load a result of ray tracing of the determined ray in a cache.

The data manager may be further configured to update properties of the result of the ray tracing of the determined ray that is stored in the cache.

The data manager may be further configured to update properties of a result of the ray tracing of the determined ray that is stored in a traversal (TRV) cache or an intersection test (IST) cache based on a ray tracing of the input ray.

The ray scanner may be further configured to extract a viewpoint and a direction of the input ray, and the data manager may be further configured to compare a viewpoint or a direction of the input ray and a viewpoint or a direction of the rays used in previous renderings to determine a ray having a viewpoint and a direction closest to the viewpoint and the direction of the input ray.

The data manager may be further configured to update a flag of a traversal (TRV) cache to maintain a result of ray tracing of the determined ray, in response to the result of the ray tracing of the determined ray being stored in a TRV cache, and to load the result of the ray tracing of the determined ray to the TRV cache, in response to the result of ray tracing of the determined ray not being stored the TRV cache.

The data manager may be further configured to update a flag of an intersection test (IST) cache so as to maintain a result of ray tracing of the determined ray, in response to the result of ray tracing of the determined ray being stored in an IST cache, and to load the result of the ray tracing of the determined ray to the IST cache, in response to the result of ray tracing of the determined ray not being stored in the IST cache.

The data manager may be further configured to store a result of ray tracing stored in a traversal (TRV) cache or an intersection test (IST) cache to a preliminary cache.

The data manager may be further configured to control an order of traversal of an acceleration structure based on the ray tracing of the determined ray.

The data manager may be further configured to control an order of an intersection test based on the ray tracing of the determined ray.

In another general aspect there is provided a method of ray tracing, the method including extracting characteristics of sequentially input rays at a ray scanner, determining groups of the rays based on the characteristics, and updating a processing order of the input rays based on a group of the groups.

The determining of the groups may include determining the groups based on the rays having a viewpoint or a direction within a range.

The determining of the groups may include determining a ray used in previous rendering with characteristics similar to the characteristics of one of the rays based on comparing the characteristics of the one of the rays and characteristics of rays used in previous renderings, and identifying a group for the one of the rays based on a result of ray tracing of its determined previous ray.

The identifying of the group may include identifying the group for the one of the rays based on a bounding box that is hit by its determined previous ray.

The updating of the processing order may include updating the processing order of input rays such that ray tracing of the rays determined to be in the same group is performed sequentially.

The characteristics may include at least one of a viewpoint, a direction, information indicating a pixel of an image, and a starting point of the ray.

In another general aspect there is provided a ray tracing apparatus including a ray scanner configured to extract characteristics of sequentially input rays, and a data manager configured to determine groups of the rays based on characteristics of the rays and to update a processing order of the input rays based on a group of the groups.

The data manager may be further configured to determine the groups of the rays based on a viewpoint or a direction of the rays being within a range.

The data manager may be further configured to determine a ray used in previous renderings with characteristics similar to the characteristics of one of the rays based on comparing characteristics of one of the rays and characteristics of rays used in previous renderings, and to identify a group for the one of the rays based on a result of ray tracing of its determined previous ray.

The data manager may be further configured to identify the group for the one of the rays based on a bounding box that is hit by its determined previous ray.

The data manager may be further configured to updates a processing order of rays such that ray tracing of the rays determined to be in the same group is performed sequentially.

Other features and aspects will be apparent from the following detailed description, the drawings, and the claims.

Figure 1:
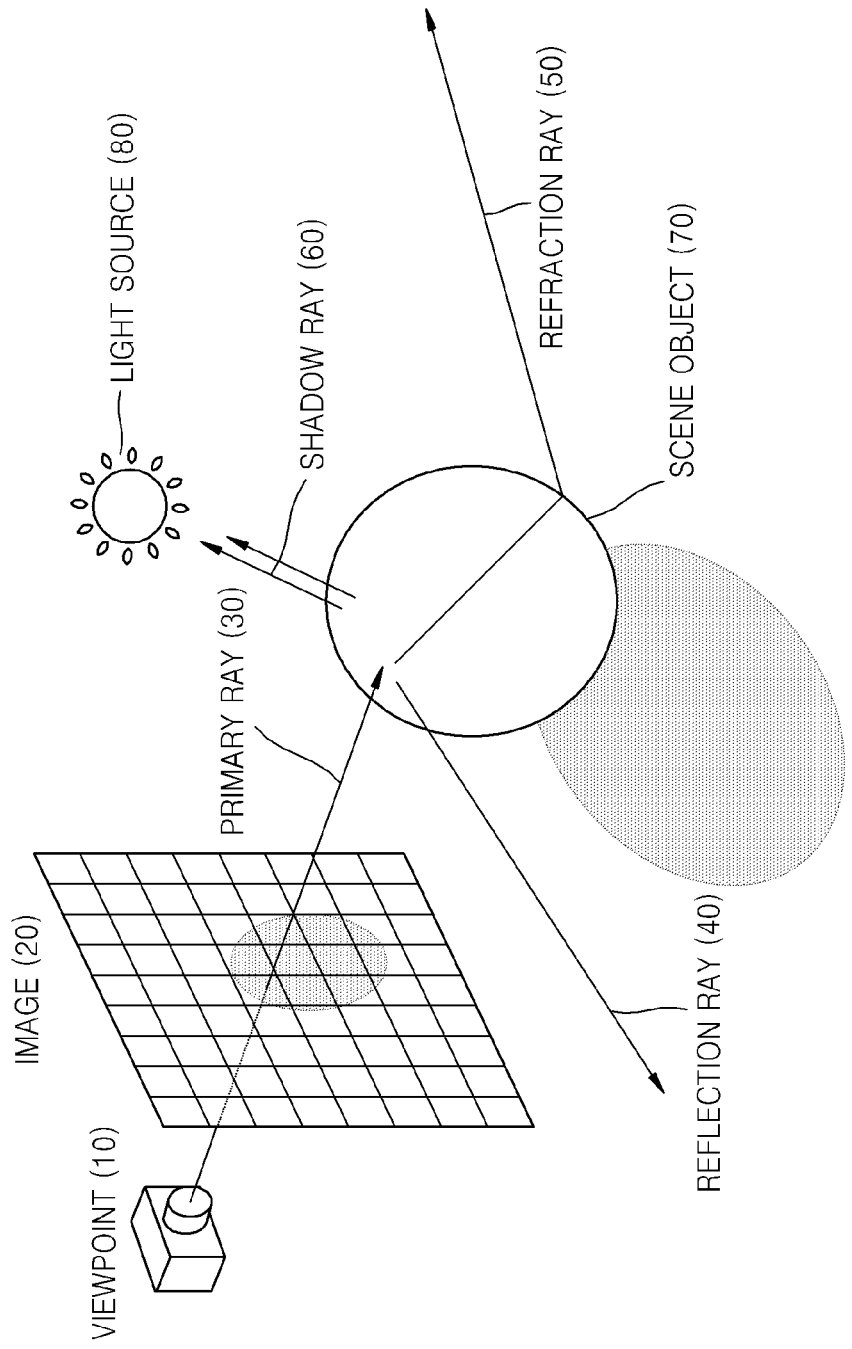
FIG. 1 is a diagram illustrating an example of a ray tracing method.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of ray tracing. Referring to FIG. 1, in three-dimensional (3D) modeling, a ray tracing core may determine a viewpoint 10 and an image 20 based upon the viewpoint 10. When the viewpoint 10 and the image 20 are determined, the ray tracing core generates a ray from the viewpoint 10 with respect to each pixel of the image 20.

In ray tracing, a primary ray 30 is generated from the viewpoint 10. The primary ray 30 intersects with a scene object 70 after passing the image 20. At an intersection point between the primary ray 30 and the scene object 70, a reflection ray 40 and a refraction ray 50 are generated. Also, a shadow ray 60 is generated at the intersection point toward a light source 80. The reflection ray 40, the refraction ray 50, and the shadow ray 60 are referred to as secondary rays. The scene object 70 denotes an object that is to be rendered with respect to the image 20. The scene object 70 includes a plurality of primitives.

The ray tracing core analyzes the primary ray 30, the secondary rays, i.e., the reflection ray 40, the refraction ray 50, and the shadow ray 60, and rays derived from the secondary rays. The ray tracing core determines a color value of each of pixels that form the image 20 based on a result of the analysis. The ray tracing core determines color values of pixels by considering characteristics of the scene object 70.

Figure 2:
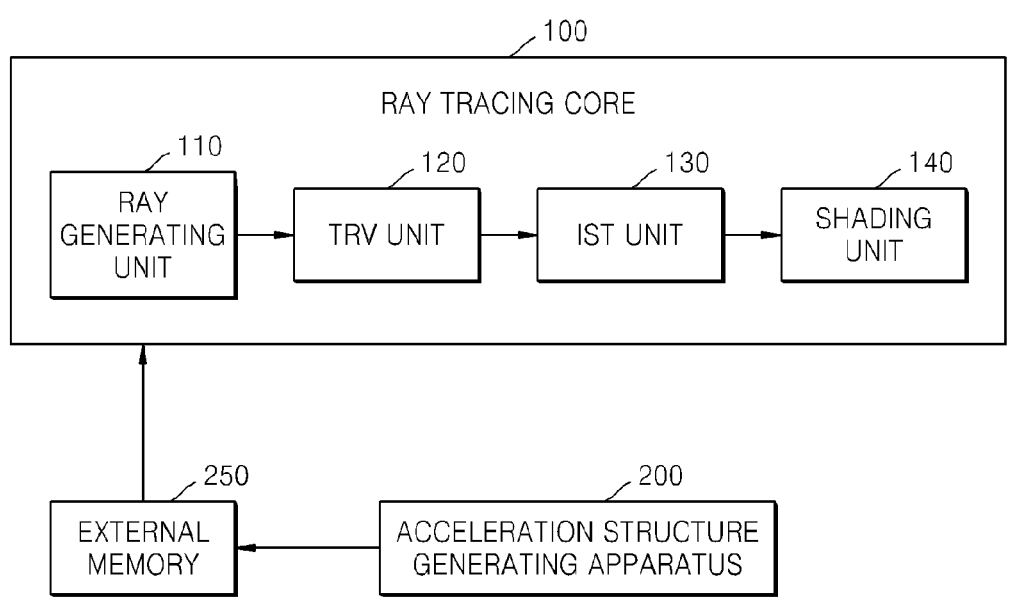
FIG. 2 is a diagram illustrating an example of a ray tracing core.

FIG. 2 is a diagram illustrating an example of a ray tracing core 100. Referring to FIG. 2, the ray tracing core 100 includes a ray generating unit 110, a traversal (TRV) unit 120, an intersection test (IST) unit 130, and a shading unit 140. In FIG. 2, the TRV unit 120 and the IST unit 130 are included in the ray tracing core 100, but the TRV unit 120 and the IST unit 130 may also be provided separately without departing from the spirit and scope of the illustrative examples described. The ray tracing core 100 of FIG. 2 includes only elements related to the illustrated example. However, is understood that those skilled in the art may include other general elements in the ray tracing core 100.

The ray tracing core 100 traces an intersection point between generated rays and objects located in 3D space, and determines color values of pixels that form an image. The ray tracing core 100 searches for an intersection point between rays and objects, generate secondary rays based on characteristics of an object at the intersection point, and determines a color value of the intersection point. The ray tracing core 100 may use results of previous traversal and previous intersection tests in traversal of an acceleration structure and an intersection test. The ray tracing core 100 may perform current rendering faster by applying results obtained from previous renderings.

The ray generating unit 110 generates a primary ray and a secondary ray. The ray tracing core 100 generates a primary ray 30 from a viewpoint 10. The ray generating unit 110 generates a secondary ray at an intersection point between the primary ray 30 and an object 70. The ray generating unit 110 may generate a second secondary ray at an intersection point between the secondary ray and the object 70. The ray generating unit 110 may generate a reflection ray 40, a refraction ray 50, or a shadow ray 60 at an intersection point between the secondary ray and the object 70. The ray generating unit 110 may generate a reflection ray 40, a refraction ray 50, or a shadow ray 60 within a preset number of times. In another non-exhaustive example, the ray generating unit 110 may determine the number of times required to generate a reflection ray 40, a refraction ray 50, or a shadow ray 60 based on characteristics of an object 70.

The TRV unit 120 receives information about a ray generated by the ray generating unit 110. The generated ray may be a primary ray 30, a secondary ray, or a ray derived from the secondary ray. For example, regarding a primary ray 30, the TRV unit 120 may receive information about a viewpoint and a direction of a generated ray. Regarding a secondary ray, the TRV unit 120 may receive information about a starting point and a direction of a secondary ray. A starting point of a secondary ray denotes a point in a primitive that a primary ray has hit. A viewpoint or a starting point may be expressed in coordinates, and a direction may be expressed in vector notation.

The TRV unit 120 reads information about an acceleration structure from an external memory 250. An acceleration structure is generated by an acceleration structure generating apparatus 200, and the generated acceleration structure is stored in the external memory 250. An acceleration structure refers to a structure including position information of objects in 3D space. For example, an acceleration structure may be a K-dimensional (KD) tree or a bounding volume hierarchy (BVH).

The TRV unit 120 traverses an acceleration structure to output an object or a leaf node that a ray has hit. The TRV unit 120 searches for nodes included in an acceleration structure to output a leaf node which a ray has hit from among lowermost-ranking leaf nodes, to the IST unit 130. The TRV unit 120 determines which of bounding boxes that form an acceleration structure is hit by a ray. The TRV unit 120 determines which of objects included in a bounding box is hit by a ray. The TRV unit 120 stores information about an object that has been hit in a TRV cache. A bounding box denotes a unit including a plurality of objects or a plurality of primitives. A bounding box may be expressed in different forms according to an acceleration structure.

The TRV unit 120 may traverse an acceleration structure based on results of previous rendering. The TRV unit 120 may traverse an acceleration structure through the same route as a previous rendering based on the result of previous rendering that is stored in a TRV cache. When the TRV unit 120 traverses an acceleration structure regarding an input ray, the TRV unit 120 may initially traverse a bounding box that is hit by a previous ray having the same viewpoint and the same direction as the input ray. Also, the TRV unit 120 may traverse an acceleration structure by referring to a search route with respect to a previous ray. A TRV cache denotes a memory to temporarily store data used by the TRV unit 120 during traversal.

The IST unit 130 receives an object or a leaf node that is hit by a ray, from the TRV unit 120. The IST unit 130 reads information about primitives included in a hit object, from the external memory 250. Information about the read primitives may be stored in an IST cache. An IST cache denotes a memory to temporarily store data used by the IST unit 130 in an intersection test.

The IST unit 130 conducts an intersection test between a ray and a primitive to output a primitive hit by a ray and an intersection point. The IST unit 130 receives information about an object that is hit by a ray from the TRV unit 120. The IST unit 130 tests which of primitives are hit by a ray from among a plurality of primitives included in a hit object. The IST unit 130 searches for a primitive hit by a ray, and outputs an intersection point indicating which point of the hit primitive intersects the ray. The intersection point may be output to the shading unit 140 as coordinates.

The IST unit 130 may conduct an intersection test by using results of previous rendering. The IST unit 130 may initially conduct an intersection test on the same primitive as that of previous rendering based on results of previous rendering that are stored in the IST cache. When the IST unit 130 conducts an intersection test on an input ray, the IST unit 130 may initially conduct an intersection test on a primitive hit by a previous ray having the same viewpoint and the same direction as the input ray.

The shading unit 140 determines a color value of a pixel based on information about an intersection point, received from the IST unit 130, and properties of a material of the intersection point. The shading unit 140 determines a color value of a pixel by considering a basic color of a material of the intersection point and effects due to a light source.

The shading unit 140 may generate a secondary ray based on material information with respect to an intersection point. As different phenomena such as reflection or refraction occur based on properties of a material, the shading unit 140 may generate a secondary ray such as a reflection ray or a refraction ray according to the properties of a material. Also, the shading unit 140 may generate a shadow ray based on a position of a light source.

The ray tracing core 100 receives data needed in ray tracing, from the external memory 250. An acceleration structure or geometry data is stored in the external memory 250. An acceleration structure is generated by the acceleration structure generating apparatus 200 and is stored in the external memory 250. Geometry data denotes information about primitives. A primitive may be a polygon such as a triangle or a rectangle, and geometry may indicate information about a vertex and a position of primitives included in an object.

The acceleration structure generating apparatus 200 generates an acceleration structure including position information about objects in 3D space. In other words, the acceleration structure generating apparatus 200 splits 3D space in a hierarchical tree structure. The acceleration structure generating apparatus 200 may generate various types of acceleration structures. For example, the acceleration structure generating apparatus 200 may generate an acceleration structure indicating a relationship between objects in 3D space by applying BVH or KD tree. The acceleration structure generating apparatus 200 may determine a maximum number of primitives of a leaf node and a depth of tree and generate an acceleration structure based on the determined maximum number and the determined depth of tree.

Figure 3:
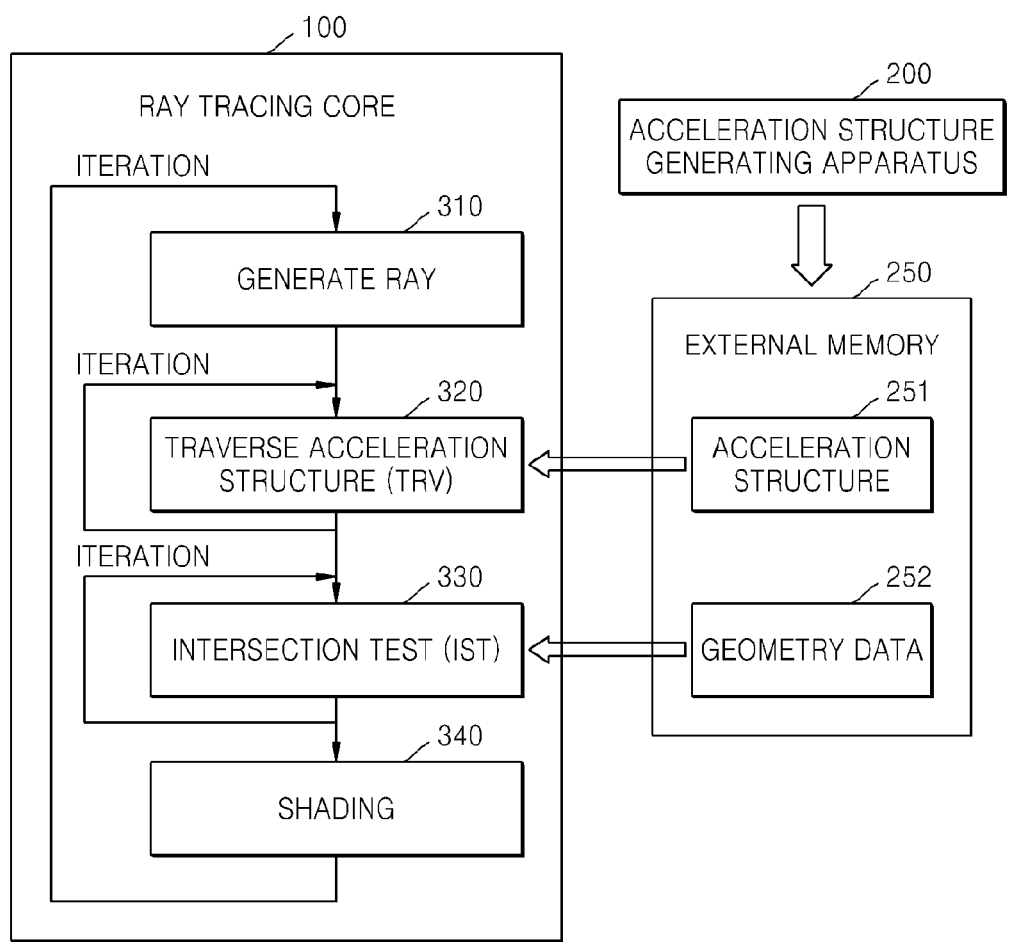
FIG. 3 is a diagram illustrating an example of ray tracing performed by a ray tracing core.

FIG. 3 is a diagram illustrating an example of ray tracing performed by the ray tracing core 100. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. FIG. 3 may also be described as a schematic view to explain an operation of the example ray tracing core 100 illustrated in FIG. 2. Accordingly, descriptions of the ray tracing core 100 also apply to ray tracing of FIG. 3, and will not be repeated here.

In operation 310, the ray tracing core 100 generates a ray. The ray tracing core 100 generates a primary ray, a secondary ray, and rays derived from the secondary ray.

In operation 320, the ray tracing core 100 traverses an acceleration structure 251. The acceleration structure 251 is read from the external memory 250. The ray tracing core 100 detects a bounding box hit by a ray, by traversing the acceleration structure 251 based on a viewpoint and a direction of generated rays. Also, the ray tracing core 100 detects an object hit by a ray from among objects included in the hit bounding box. The ray tracing core 100 repeats traversing the acceleration structure 251 until a hit object is detected. The ray tracing core 100 traverses an acceleration structure along a predetermined route, and when a leaf node on the searched route is not hit by a ray, the ray tracing core 100 traverses other routes in an acceleration structure.

The ray tracing core 100 may sequentially traverse all routes but may initially traverse a predetermined route based on search information of a previous ray. The ray tracing core 100 may initially search for a route in which a hit leaf node is included in a previous node when the previous ray has the same or similar viewpoint and the same or similar direction as a current ray.

In operation 330, the ray tracing core 100 conducts an intersection test. The ray tracing core 100 reads geometry data 252 of primitives from the external memory 250. The ray tracing core 100 conducts an intersection test based on the geometry data 252 that it read. The ray tracing core 100 iterates an intersection test until a hit primitive is detected. The ray tracing core 100 conducts an intersection test on a primitive, and when any primitive is hit by a ray, the ray tracing core 100 conducts an intersection test on another primitive.

The ray tracing core 100 may sequentially conduct an intersection test on all primitives but may also initially test a predetermined primitive based on information about an intersection test of a previous ray. The ray tracing core 100 may initially conduct an intersection test on a primitive that is hit by a previous ray when the previous ray and a current ray have the same or similar viewpoint and the same or similar direction.

In operation 340, the ray tracing core 100 conducts shading of a pixel based on the intersection test. After operation 340 is completed, the ray tracing core 100 proceeds to operation 310. The ray tracing core 100 iterates operations 310 through 340 with respect to all pixels that form an image.

Figure 4:
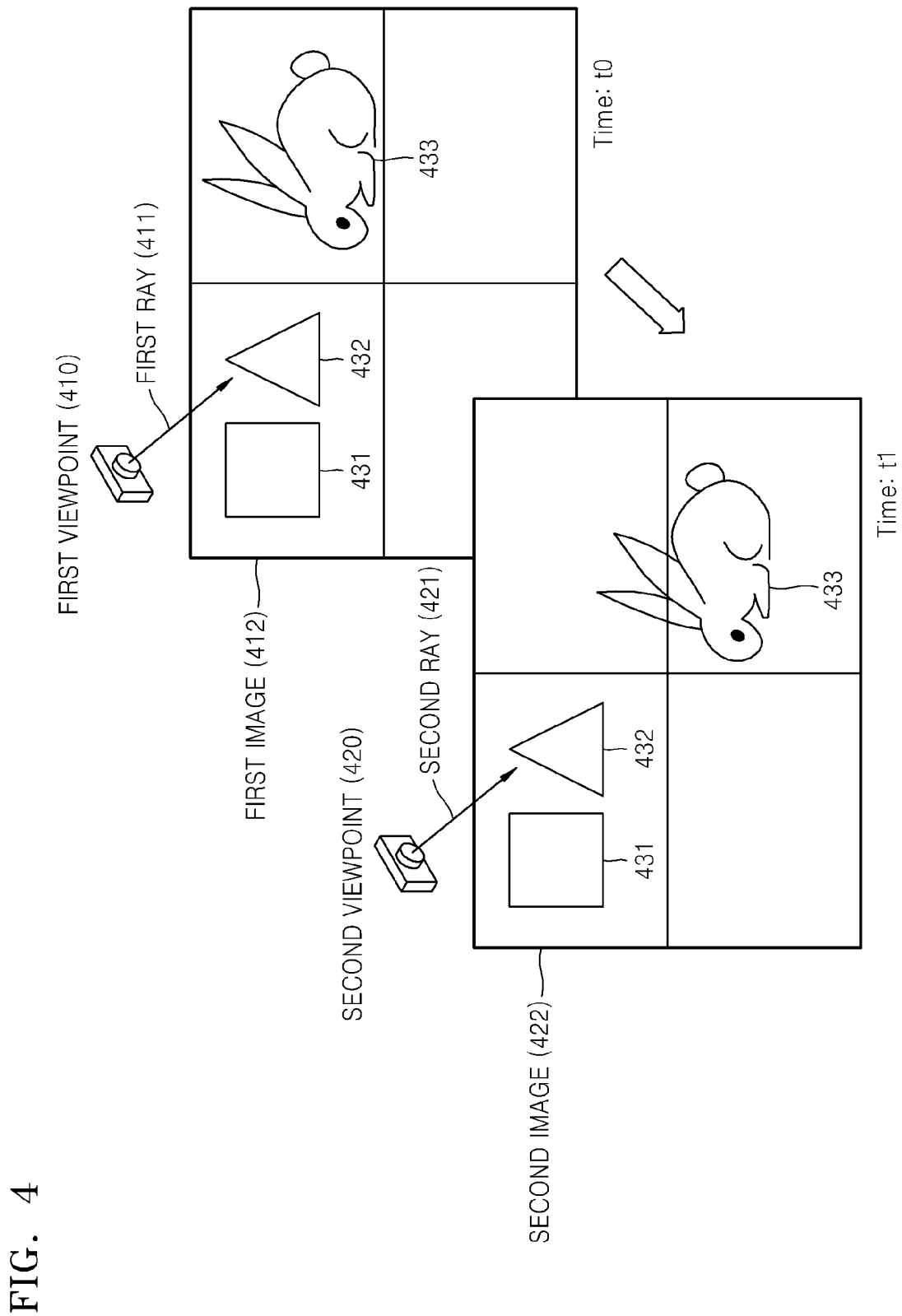
FIG. 4 is a diagram illustrating an example of a method of accelerating ray tracing.

FIG. 4 is a diagram illustrating an example of a method of accelerating ray tracing. Referring to FIG. 4, a first image 412 is an image that is rendered at t=0, and a second image 422 is an image that is rendered at t=1. As only one object 433 has moved between the first image 412 and the second image 422, the first image 412 and the second image 422 are similar. Accordingly, the ray tracing core 100 may conduct rendering with respect to the second image 421 by using a result of rendering the first image 412. For example, when a first viewpoint 410 and a second viewpoint 420 are at the same position, and a first ray 411 and a second ray 421 are in the same direction, the ray tracing core 100 may accelerate ray tracing of the second ray 421 by applying a result of ray tracing with respect to the first ray 411. The TRV unit 120 of the ray tracing core 100 may initially traverse a bounding box hit by the first ray 411 when conducting a search with respect to the second ray 421. The IST unit 130 of the ray tracing core 100 may initially conduct an intersection test on a triangle 432 hit by the first ray 411 during an intersection test on the second ray.

Figure 5:
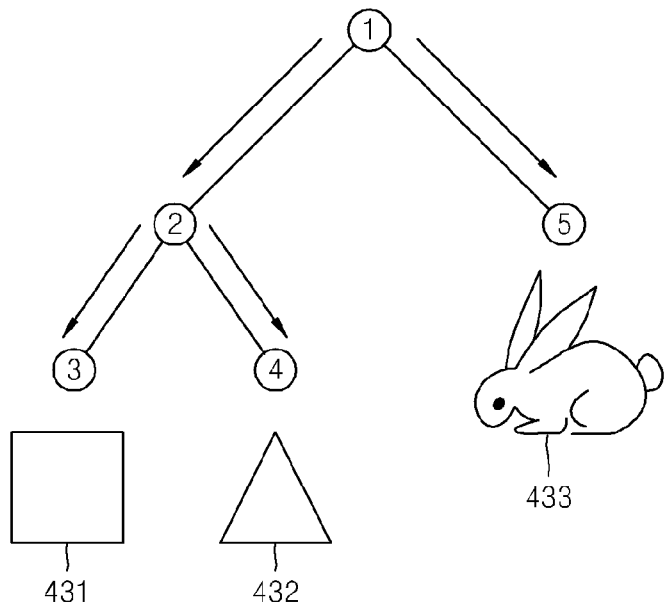
FIG. 5 is a diagram illustrating an example of a method of accelerating ray tracing of FIG. 4.

FIG. 5 is a diagram illustrating an example of a method of accelerating ray tracing of FIG. 4. Referring to FIG. 5, an acceleration structure includes five nodes, node 1 through 5, and nodes 3 through 5 each denote a leaf node.

The TRV unit 120 may search an acceleration structure along three routes. First, the TRV unit 120 may traverse an acceleration structure along a first route, i.e., along node 1, node 2, and node 3. Secondly, the TRV unit 120 may traverse an acceleration structure along a second route, i.e., node 1, node 2, and node 4. Thirdly, the TRV unit 120 may traverse an acceleration structure along a third route, i.e., node 1 and node 5. When the TRV unit 120 conducts a search with respect to the second ray 421, the TRV unit 120 initially traverses the second route through which a triangle 432 hit by the first ray 411 is searched. Accordingly, the TRV unit 120 may omit an operation of traversing the first route or the third route.

Figure 6:
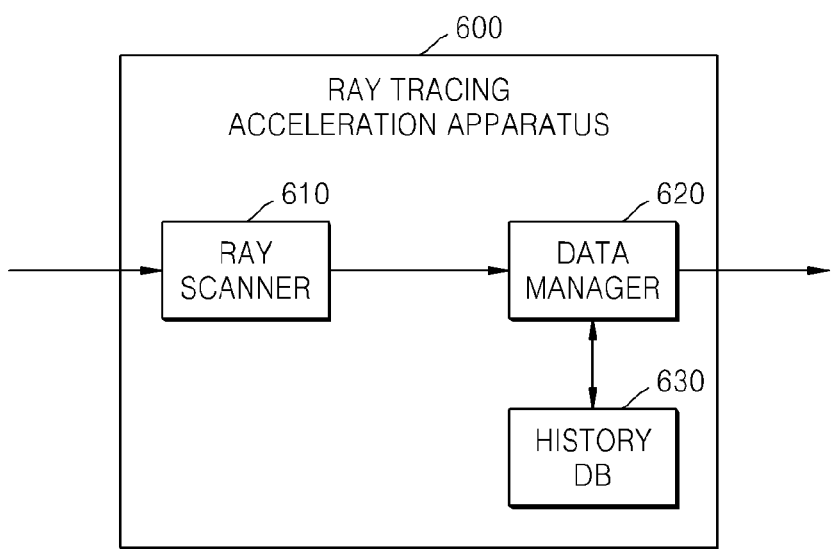
FIG. 6 is a diagram illustrating an example of a ray tracing acceleration apparatus.

FIG. 6 is a diagram illustrating an example of a ray tracing acceleration apparatus 600. Referring to FIG. 6, the ray tracing acceleration apparatus 600 includes a ray scanner 610, a data manager 620, and a history database (DB) 630. The ray tracing acceleration apparatus 600 may be included in the ray tracing core 100.

The history DB 630 stores characteristics of rays used in previous rendering and the results of ray tracing. The history DB 630 stores information about rays used in previous rendering and transmits the stored information to the data manager 620 upon request. Results of ray tracing may include, but is not limited to, a result of a traversal of an acceleration structure or a result of an intersection test that is performed in previous rendering. For example, results of ray tracing may include the bounding box or primitive hit by the ray.

The ray scanner 610 extracts characteristics of an input ray. The input ray is a ray that is generated by the ray generating unit 110 for rendering a current image. For example, characteristics of a ray may indicate a viewpoint and a direction of the ray. In addition, the characteristics of a ray may include information indicating a pixel of an image to which the ray is related. For a secondary ray, ray characteristics may include a starting point and a direction of a ray.

The ray scanner 610 outputs the extracted characteristics of the ray to the data manager 620.

The data manager 620 determines whether any ray among the rays previously used has characteristics that are most similar to that of the input ray. The data manager 620 does this by comparing characteristics of an input ray with characteristics of rays used in previous rendering. The data manager 620 compares a viewpoint of the input ray with viewpoints of the used rays. Also, the data manager 620 compares a direction of the input ray with directions of the used rays. The data manager 620 determines that one ray among the rays used in previous rendering is most similar to the input ray based on a result of the comparison.

The data manager 620 performs a set up for ray tracing of the input ray based on a result of ray tracing of the previous ray. The data manager 620 performs a set up for performing traversal or an intersection test on an object or a primitive that is hit by the determined previous ray.

Figure 7:
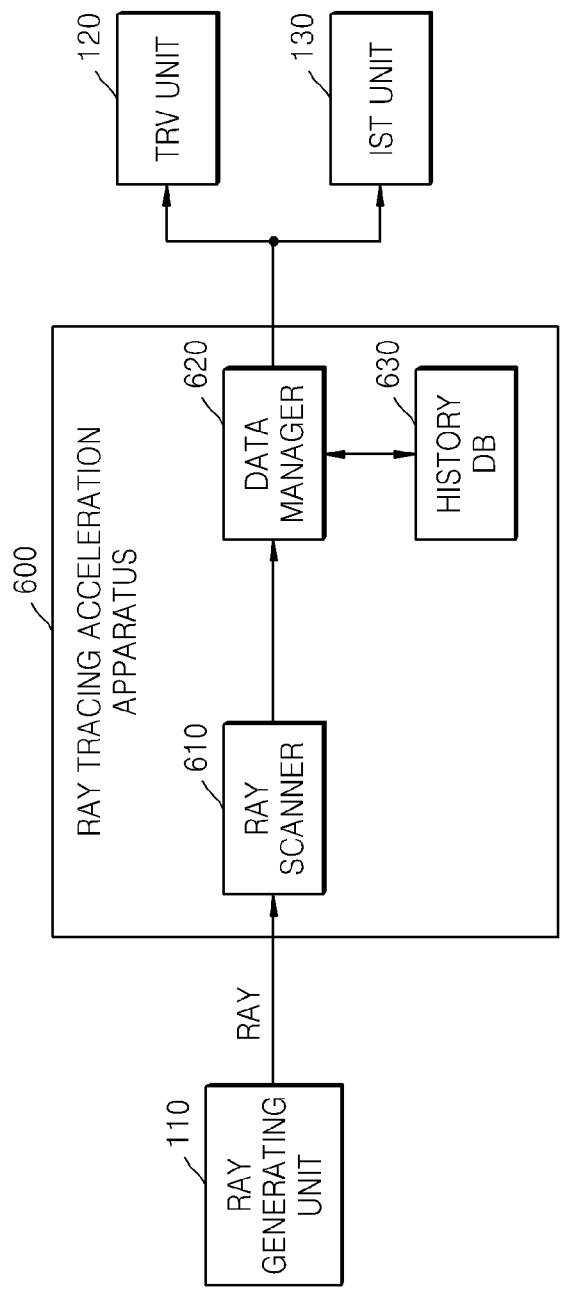
FIG. 7 is a diagram illustrating an example of a ray tracing acceleration apparatus for acceleration of ray tracing by controlling a traversal (TRV) unit and an intersection test (IST) unit.

FIG. 7 is a diagram illustrating an example of a ray tracing acceleration apparatus 600 for acceleration of ray tracing by controlling the TRV unit 120 or the IST unit 130.

The ray tracing acceleration apparatus 600 performs a set up for ray tracing of an input ray based on a result of ray tracing of a previous ray. The data manager 620 of the ray tracing acceleration apparatus 600 performs a set up for tracing of an input ray by transmitting a result of ray tracing of the determined previous ray to the TRV unit 120 or the IST unit 130. The data manager 620 transmits a result of traversal of the determined previous ray to the TRV unit 120 so that the TRV unit 120 performs traversal of an input ray based on the result of traversal of the determined previous ray. The data manager 620 transmits data indicating which bounding box or which object the determined previous ray has hit. The TRV unit 120 initially traverses a bounding box or an object that is hit by the determined previous ray to perform traversal by the input ray.

In another example, the data manager 620 transmits a result of an intersection test of the determined previous ray to the IST unit 130. The IST 130 may perform an intersection test of an input ray based on the result of the intersection test of the determined previous ray. The data manager 620 transmits data indicating which primitive is hit by the determined previous ray to the IST unit 130. The IST unit 130 initially performs an intersection test on a primitive that is hit by the determined previous ray to perform an intersection test on the input ray.

The data manager 620 may control one of the TRV unit 120 and the IST unit 130 or both of them at the same time.

Figure 8:
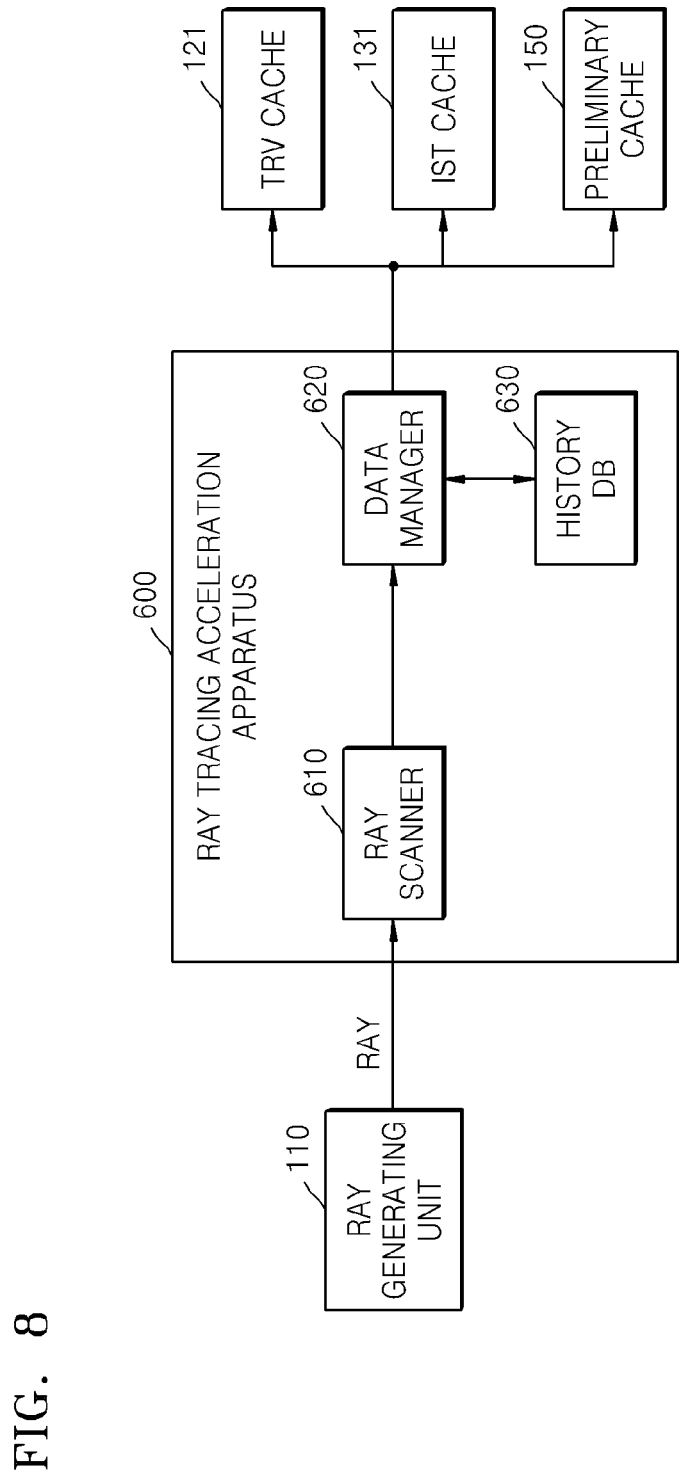
FIG. 8 is a diagram illustrating an example of a ray tracing acceleration apparatus for acceleration of ray tracing by controlling a TRV cache or an IST cache.

FIG. 8 is a diagram illustrating an example of a ray tracing acceleration apparatus 600 for acceleration of ray tracing by controlling a TRV cache 121 or an IST cache 131.

The ray tracing acceleration apparatus 600 loads a result of ray tracing of the determined previous ray in the TRV cache 121 or the IST cache 131 included in the ray tracing core 100 or updates properties of a result of ray tracing of the determined previous ray stored in the TRV cache 121 and the IST cache 131.

When a result of ray tracing of the determined previous ray is not stored in the TRV cache 121 or the IST cache 131, the data manager 620 reads a result of ray tracing of the determined previous ray from the external memory 250 (not shown) and loads the result to the TRV cache 121 or the IST 131. For example, when data about an object that is hit by the determined previous ray is not stored in the TRV cache 121, the data manager 620 reads data about an object hit by the determined previous ray, from the external memory 250 (not shown) and loads the data in the TRV cache 121. In another example, when data about a primitive hit by the determined previous ray is not stored in the IST cache 131, the data manager 620 reads data about a primitive that is hit by the determined previous ray, from the external memory 250 (not shown) and loads the data in the IST cache 131.

After the set up, the data manager 620 updates properties of the result of ray tracing of the determined previous ray stored in the TRV cache 121 or the IST cache 131 based on a result of ray tracing of an input ray. The data manager 620 performs set up, and performs ray tracing of the input ray. After the ray tracing core 100 has performed traversal with respect to an input ray, when a result of traversal of a previous ray that is stored in the TRV cache 121 and a result of a traversal of a current ray are the same, the data manager 620 updates properties of data indicating the traversal result of the previous ray so that the traversal result of the previous ray is not deleted from the TRV cache 121. In addition, after the ray tracing core 100 has performed an intersection test with respect to an input ray, when a result of an intersection test of a previous ray stored in the IST cache 131 and a result of an intersection test of a current ray are the same, the data manager 620 updates properties of data indicating the result of the intersection test of the previous ray so that the result of the intersection test of the previous ray is not deleted from the IST cache 131.

For example, when a result of ray tracing of a previous ray is stored in the TRV cache 121, the data manager 620 updates a flag of the TRV cache 121 so that a result of traversal of a previous ray is maintained in the TRV cache 121. Also, when a result of an intersection test of a previous ray is stored in the IST cache 131, the data manager 620 updates a flag of the IST cache 131 so that the result of the intersection test of the previous ray is maintained in the IST cache 131. A flag may be 1-bit data indicating properties of a line of a cache. When a flag is on (or is 1), it indicates that a line of a cache whose flag is on, may not be deleted. When a flag is off (or is 0), it indicates that a line of a cache whose flag is off, may be deleted.

The data manager 620 may control one of the TRV cache 121 and the IST cache 131 or it may control both of them at the same time.

The data manager 620 may store a result of ray tracing that is stored in the TRV cache 121 or the IST cache 131 in a preliminary cache 150. When a flag of a line of the TRV cache 121 or the IST cache 131 that stores a result of ray tracing is on but the line has to be changed, the data manager 620 adds a tag to the line and stores the result of ray tracing in the preliminary cache 150. The data manager 620 adds a tag indicating an input ray to the result of ray tracing and stores the result of ray tracing in the preliminary cache 150 so that the line whose flag is on is not deleted. When an input ray has the same ray tracing result as a ray tracing result stored in the preliminary cache 150, data stored in the preliminary cache 150 is loaded to the TRV cache 121 or the IST cache 131. When an input ray does not have the same ray tracing result as that stored in the preliminary cache 150, a flag is released so that new data may be stored in the preliminary cache 150. That is, the data manager 620 updates the flag of the line in which a ray tracing result is stored, to an off state.

Figure 9:
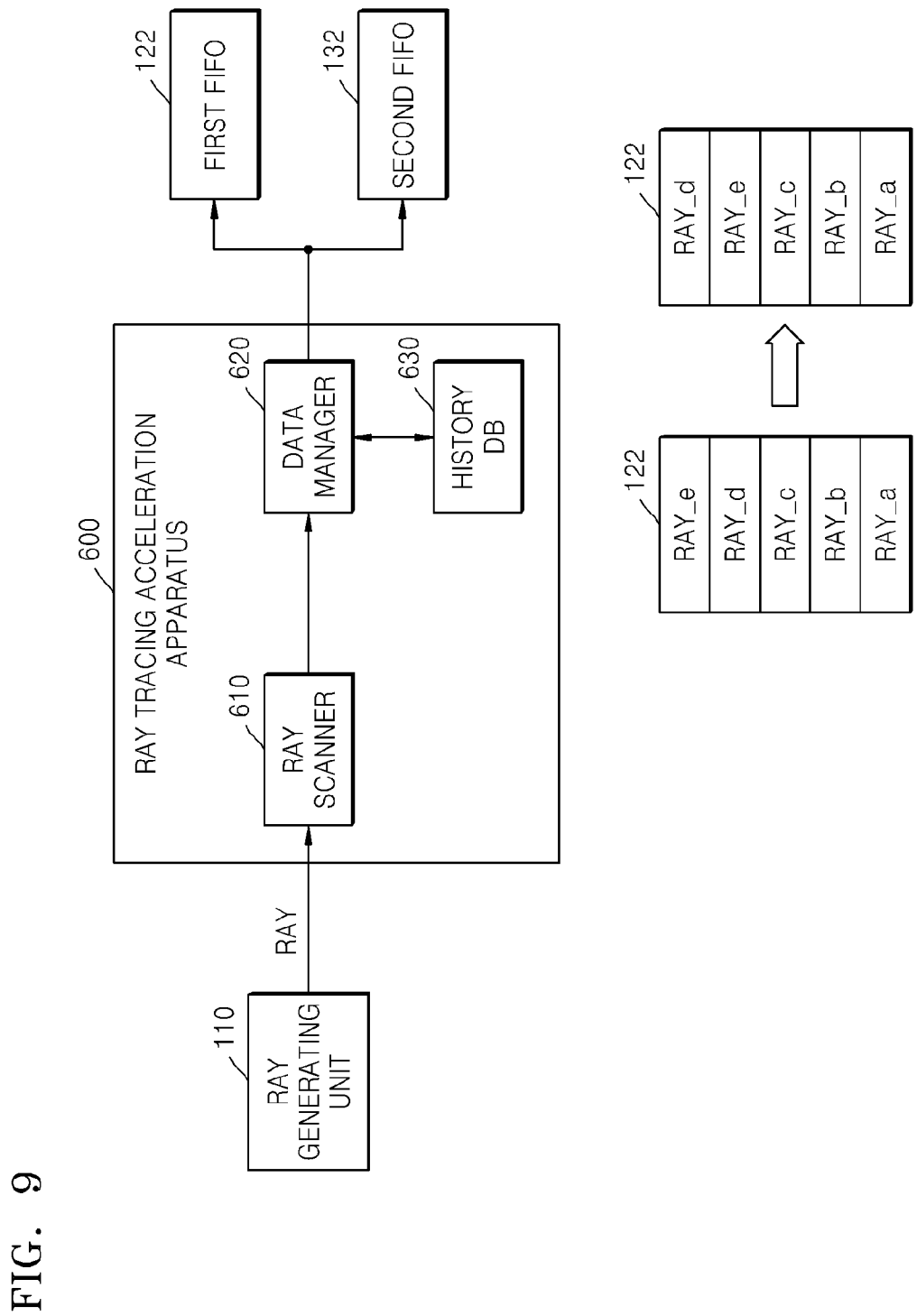
FIG. 9 is a diagram illustrating an example of processing input rays by using a ray tracing acceleration apparatus.

FIG. 9 is a diagram illustrating an example of a processing order of input rays by using the ray tracing acceleration apparatus 600. Referring to FIG. 9, the ray tracing acceleration apparatus 600 updates an order of rays stored in a first FIFO 122 and a second FIFO 132 and controls a processing order of rays. The ray scanner 610 extracts characteristics of rays that are sequentially input and outputs the characteristics of rays to the data manager 620.

The data manager 620 determines groups of input rays, based on the characteristics of the rays, and updates a processing order of the input rays based on the determined group. The data manager 620 updates a processing order of rays stored in the first FIFO 122 and the second FIFO 132 so that rays determined to be in the same group are sequentially processed in the TRV unit 120 or the IST unit 130.

The data manager 620 compares characteristics of rays extracted by the ray scanner 610 to determine groups of rays. For example, the data manager 620 may determine rays having a viewpoint or a direction within a predetermined range as belonging to the same group.

The data manager 620 may determine that input rays belong to a group based on a result of ray tracing. The data manager 620 compares input rays with previous rays to determine any previous ray having the characteristics similar to that of the input rays. The data manager 620 determines the input rays to be in the same group when a ray tracing result of the input rays is similar to the ray tracing result of the previous rays. For example, when a first input ray corresponds to a first previous ray, and a second input ray corresponds to a second previous ray, the data manager 620 compares a bounding box, which is hit by the first previous ray, and a bounding box, which is hit by the second previous ray. When the first previous ray and the second previous ray hit the same bounding box, the data manager 620 determines the first input ray and the second input ray to be in the same group.

The first FIFO 122 and the second FIFO 132 are predetermined buffers that sequentially store input rays. For example, the first FIFO 122 sequentially outputs input rays to the TRV 120. The second FIFO 132 sequentially outputs input rays to the IST unit 130.

When a ray of a second group is to be processed while rays of a first group are being processed, the data manager 620 modifies a ray processing order such that the ray of the second group is processed after the rays of the first group are completely processed. The data manager 620 modifies an order of rays stored in the first FIFO 122 or the second FIFO 132 and controls the first FIFO 122 or the second FIFO 132 so that rays are output to the TRV unit 120 or the IST unit 130 according to the modified order. Rays stored in the first FIFO 122 and the second FIFO 132 are those for which ray tracing is not performed yet. For example, a plurality of rays RAY_a through RAY_e are stored in the first FIFO 122. When rays RAY_a, RAY_b, RAY_c, and RAY_e are classified as the same group, and a ray RAY_d is classified as another group, the data manager 620 modifies a processing order of rays RAY_d and RAY_e to adjust schedules of rays such that the rays RAY_a, RAY_b, RAY_c, and RAY_e are sequentially output to the TRV unit 120. The data manager 620 also adjusts a processing order of rays stored in the second FIFO 132 in the same manner as that of the rays of the first FIFO 122.

Figure 10:
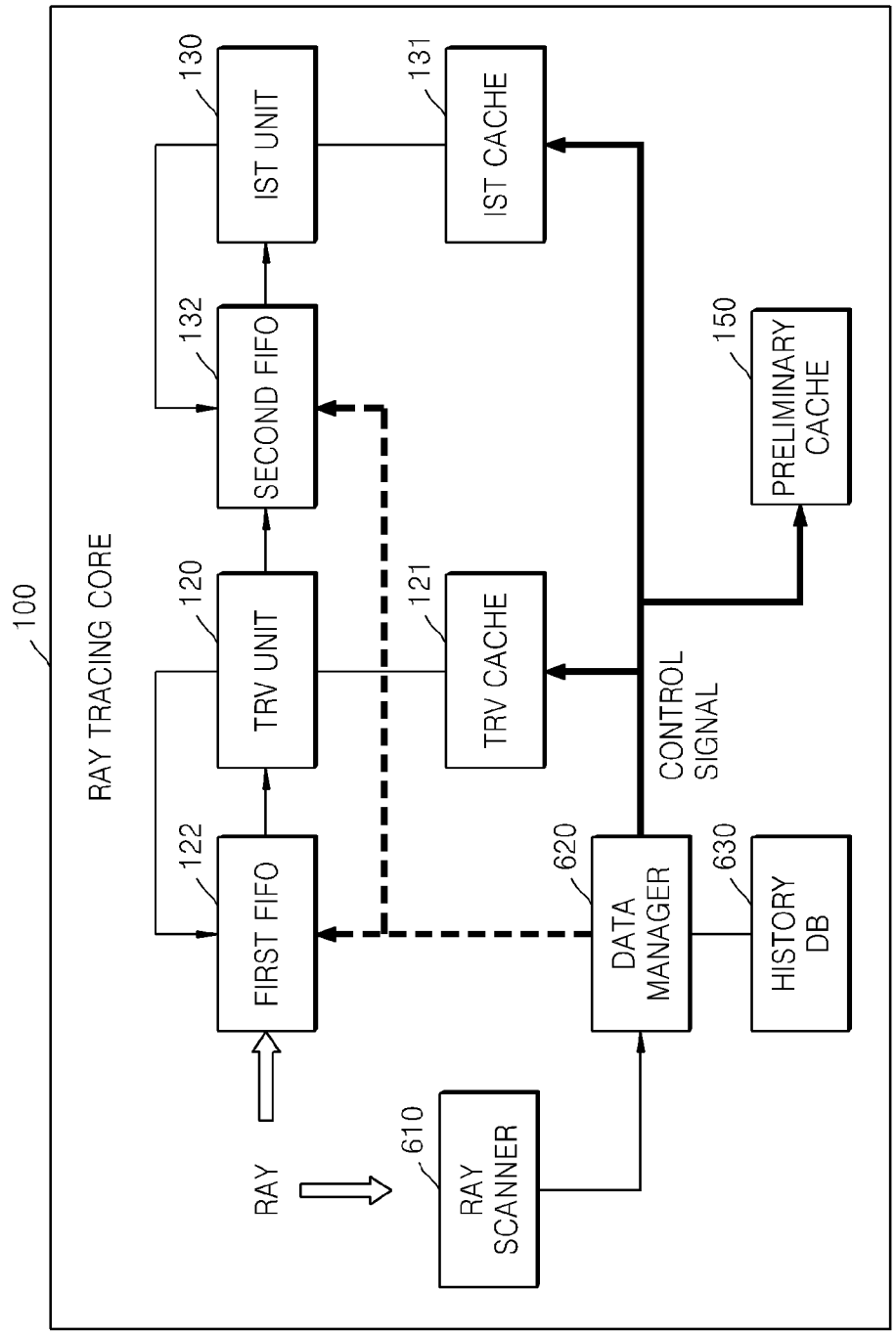
FIG. 10 is a is a diagram illustrating an example of a ray tracing core.

FIG. 10 is a diagram illustrating an example of a ray tracing core 100. Referring to FIG. 10, the ray tracing core 100 extracts characteristics of rays and performs ray tracing based on the characteristics of the rays.

The ray tracing core 100 may choose to process rays of the same group together. The ray tracing core 100 may modify a processing order of rays stored in the first FIFO 122 or the second FIFO 132 and may allow the rays of the second group to be processed after all of rays of the first group are processed.

The ray tracing core 100 determines rays having similar characteristics to be in the same group. The ray scanner 610 may extract a viewpoint or a direction of rays, and the data manager 620 may classify rays by comparing the extracted viewpoint or the direction. The data manager 620 may classify rays whose extracted viewpoint or direction is within a predetermined range as belonging to the same group.

The ray tracing core 100 may determine a group for the input rays by using characteristics of previous rays stored in the history DB 630. The ray scanner 610 may extract a viewpoint or a direction of rays, and compare the viewpoint or the direction of an input ray with a viewpoint or a direction of a previous ray to determine a previous ray that is the most similar to an input ray. The data manager 620 classifies previous rays having similar ray tracing results to belong to the same group. The data manager 620 classifies input rays corresponding to the previous rays to also belong to the same group as the corresponding previous rays. For example, the data manager 620 classifies previous rays as one group based on results of ray tracing of previous rays. The data manager 620 classifies previous rays that have hit the same bounding box to be in the same group. The data manager 620 determines previous rays that are most similar to input rays, and the input rays are classified to belong to same group as the determined previous rays.

The TRV unit 120 or the IST unit 130 reads a ray stored in the first FIFO 122 or the second FIFO 132, and performs a traversal or an intersection test on the read ray. The TRV unit 120 or the IST unit 130 may process rays of the same group in a bundle. For rays of the same group, the TRV unit 120 may receive information regarding which bounding box is hit by a ray to be processed, from the data manager 620. The TRV unit 120 may start traversal from the hit bounding box, thereby reducing the traversal time. As the same data regarding the bounding box that used is stored in the TRV cache 121, cache misses of the TRV unit 120 may be reduced. The IST unit 130 may also receive information regarding which primitive is hit by a ray to be processed, from the data manager 620. The IST unit 130 may perform an intersection test on the hit primitive initially, thereby reducing the intersection test time. As the data that is applied for primitives is stored in the IST cache 131, cache misses of the IST unit 130 may be reduced.

The ray tracing core 100 controls the TRV unit 120 or the IST unit 130 based on a ray tracing result of previous rays. The data manager 620 may control an order of performing ray tracing of the TRV unit 120 or the IST unit 130. For example, the data manager 620 may designate a node or path to be initially searched when the TRV unit 120 traverses an acceleration structure. The TRV unit 120 initially searches for a node or path designated by the data manager 620. The data manager 620 may designate a primitive to be initially tested when the IST unit 130 performs an intersection test. The IST unit 130 initially conducts an intersection test on the primitive designated by the data manager 620.

The data manager 620 may update a replacement policy of a cache. The data manager 620 controls the TRV cache 121 or the IST cache 131 by using a result of ray tracing of a previous ray. The data manager 620 updates properties of data to maintain or delete the data used in ray tracing of a previous ray in the TRV cache 121 or the IST cache 131.

The data manager 620 checks whether data regarding a bounding box which is hit by a previous ray that is the closest to an input ray is stored in the TRV cache 121. If data about a hit bounding box is stored in the TRV cache 121, the data manager 620 updates a flag of a line in which the data is stored, so that the data is not deleted. If data about a hit bounding box is not stored in the TRV cache 121, the data manager 620 reads the data about the hit bounding box from the external memory 250 and loads the data in the TRV cache 121.

The data manager 620 checks whether data regarding a primitive which is hit by a previous ray that is the closest to an input ray is stored in the IST cache 131. If data about a hit primitive is stored in the IST cache 131, the data manager 620 updates a flag of a line in which the data is stored, so that the data is not deleted. If data about a hit primitive is not stored in the IST cache 131, the data manager 620 reads the data about the hit primitive from the external memory 250 and loads the data in the IST cache 131.

The data manager 620 may store the data stored in the TRV cache 121 or the IST cache 131 in the preliminary cache 150. The data manager 620 may store data whose flag is on in the preliminary cache 150 from among the data stored in the TRV cache 121 or the IST cache 131. The data stored in the preliminary cache 150 may be loaded to the TRV cache 121 or the IST cache 131 again according to ray tracing of an input ray or may be replaced with new data later as the flag is changed to off.

Figure 11:
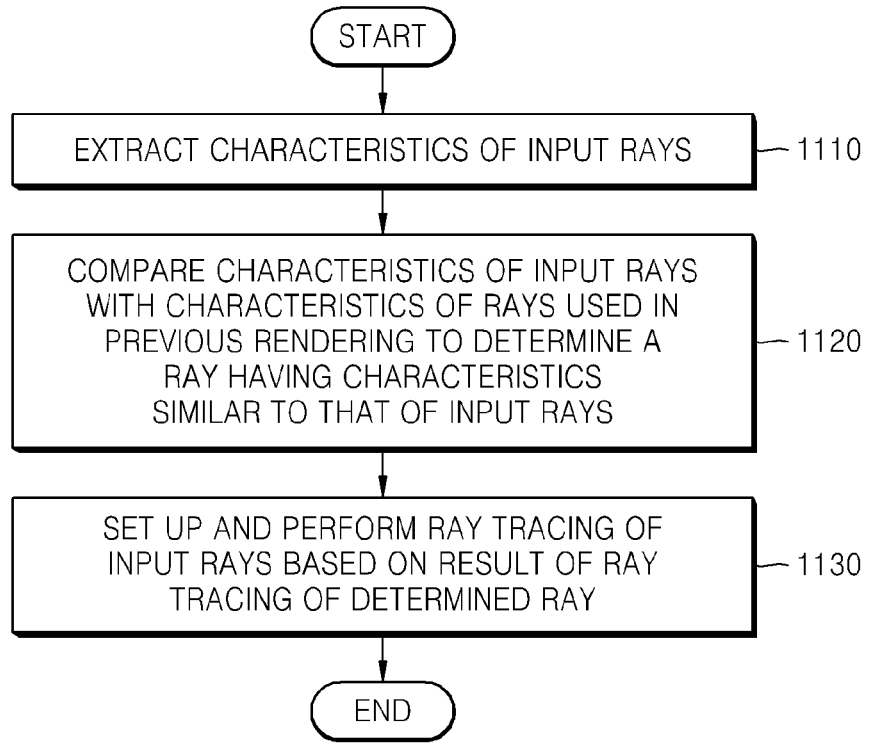
FIG. 11 is a diagram illustrating an example of a method of accelerating ray tracing.

FIG. 11 is a diagram illustrating an example of a method of accelerating ray tracing. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently.

In operation 1110, the ray tracing acceleration apparatus 600 extracts characteristics of an input ray. In operation 1120, the ray tracing acceleration apparatus 600 compares characteristics of an input ray with characteristics of rays used in previous rendering to determine a ray from among the used rays that has characteristics that are similar to those of the input ray. In operation 1130, the ray tracing acceleration apparatus 600 conducts a set up for ray tracing of an input ray based on a result of ray tracing of the determined previous ray. The ray tracing acceleration apparatus 600 conducts ray tracing with respect to an input ray based on the set up.

Figure 12:
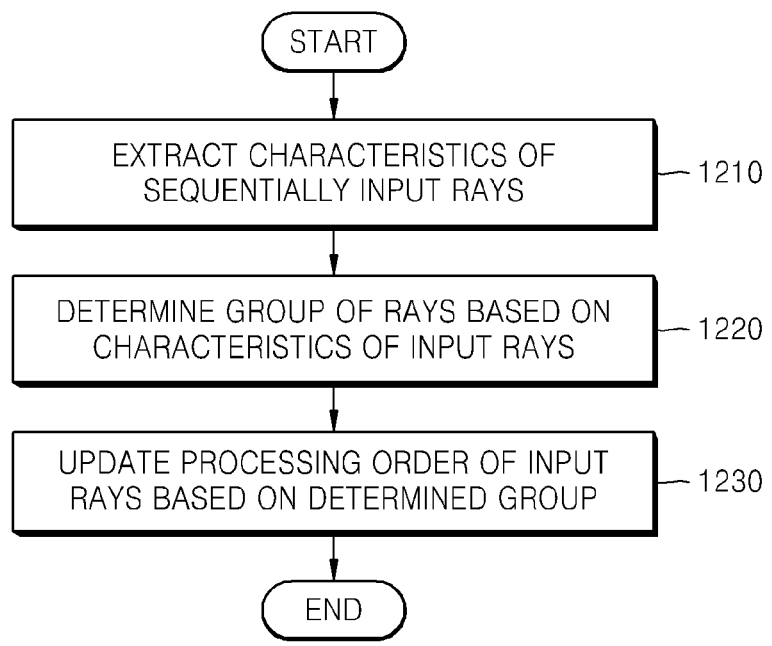
FIG. 12 is a is a diagram illustrating an example of a method of accelerating ray tracing.

FIG. 12 is a diagram illustrating an example of a method of accelerating ray tracing. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently.

In 1210, the ray tracing acceleration apparatus 600 extracts characteristics of sequentially input rays. In operation 1220, the ray tracing acceleration apparatus 600 determines groups of rays based on characteristics of the input rays. In operation 1230, the ray tracing acceleration apparatus 600 updates a processing order of input rays based on the determined groups of rays. The ray tracing acceleration apparatus 600 readjusts the processing order of the input rays such that rays included in the same groups are sequentially processed.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

As described above, according to an aspect, rendering of a current frame may be performed using a result of ray tracing performed during rendering of a previous frame, and thus, rendering of the current frame may be performed quickly, and cache misses may be reduced.

When performing ray tracing of an input ray, a node which a previous ray has intersected is initially searched, thereby quickly performing traversal of an acceleration structure. When performing ray tracing of an input ray, an intersection test of a primitive which a previous ray has intersected is performed initially, thereby quickly performing the intersection test.

Before performing ray tracing of an input ray, information about a node which a previous ray has intersected is loaded or retained in a cache, thereby reducing cache misses. Before performing ray tracing of an input ray, information about a primitive which a previous ray has intersected is loaded or retained in a cache, thereby reducing cache misses.

An order of processing rays that are sequentially input may be rearranged to process similar rays together, thereby quickly performing ray tracing of input rays.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of ray tracing comprising:
   extracting characteristics of an input ray at a ray scanner;
   determining a ray with characteristics similar to that of the input ray based on comparing characteristics of the input ray with characteristics of rays used in previous renderings of previous images;
   conducting a set up for ray tracing of the input ray based on a ray tracing of the determined ray by loading data of a primitive from a memory in response to the data not being stored in a TRV cache or an IST cache, wherein the data of the primitive comprises information of a vertex and a position;
   updating a flag of the TRV cache so that a result of the ray tracing of the determined ray is maintained to indicate that the result is not deleted in the respective TRV cache when the result of the ray tracing of the determined previous ray is stored in the TRV cache and updating a flag of the IST cache so that a result of the ray tracing of the determined ray is maintained to indicate that the result is not deleted in the respective TRV cache when the result of the ray tracing of the determined previous ray is stored in the IST cache; and
   loading the result of the ray tracing of the determined ray to the respective TRV cache or the IST cache, in response to a result of the ray tracing of the determined ray not being stored in the respective TRV cache or the IST cache.

2. The method of claim 1, wherein the conducting of the set up comprises conducting the set up by loading a result of the ray tracing of the determined ray in a cache.

3. The method of claim 1, wherein the conducting of the set up comprises conducting the set up by updating properties of the result of the ray tracing of the determined ray that is stored in a cache.

4. The method of claim 1, wherein properties of the ray tracing of the determined ray are stored in the traversal (TRV) cache or the intersection test (IST) cache, and the properties are updated based on the ray tracing of the input ray.

5. The method of claim 1, wherein:
   the extracting of the characteristics comprises extracting a viewpoint and a direction of the input ray; and
   the determining of the ray with similar characteristics comprises determining the ray based on comparing a viewpoint or a direction of the input ray with a viewpoint or a direction of the rays used in the previous renderings to determine a ray having a viewpoint and direction closest to the viewpoint and the direction of the input ray.

6. The method of claim 1, wherein the conducting of the set up for the ray tracing comprises transferring a result of a ray tracing stored in the traversal (TRV) cache or the intersection test (IST) cache to a preliminary cache.

7. The method of claim 1, further comprising controlling an order of traversal of an acceleration structure, at a traversal (TRV) unit, based on the ray tracing of the determined ray.

8. The method of claim 1, further comprising controlling an order of an intersection test, at an intersection test (IST) unit, based on the ray tracing of the determined ray.

9. A non-transitory computer-readable recording hardware medium having embodied thereon a program for executing the method of claim 1.

10. A ray tracing apparatus comprising:
    a history database (DB) configured to stores characteristics and results of ray tracing of rays used in a previous rendering of a previous image;
    a ray scanner configured to extract characteristics of an input ray; and
    a data manager configured to determine a ray with characteristics similar to that of the input ray based on comparing characteristics of the input ray with characteristics of the rays used in the previous rendering, to conduct a set up for a ray tracing of the input ray based on a ray tracing of the determined ray by loading data of a primitive from a memory in response to the data not being stored in a TRV cache or a IST cache, wherein the data of the primitive comprises information of a vertex and a position, to update a flag of the TRV cache so that a result of the ray tracing of the determined ray is maintained to indicate that the result is not deleted in the respective TRV cache when the result of the ray tracing of the determined previous ray is stored in the TRV cache and update a flag of the IST cache so that a result of the ray tracing of the determined ray is maintained to indicate that the result is not deleted in the respective TRV cache when the result of the ray tracing of the determined previous ray is stored in the IST cache, and to load the result of the ray tracing of the determined ray to the respective TRV cache or the IST cache, in response to a result of the ray tracing of the determined ray not being stored in the respective TRV cache or the IST cache,
    wherein the ray scanner and the data manager are implemented by one or more processors.

11. The apparatus of claim 10, wherein the data managing processor is further configured to load the result of the ray tracing of the determined ray in a cache.

12. The apparatus of claim 10, wherein the data managing processor is further configured to update properties of the result of the ray tracing of the determined ray that is stored in a cache.

13. The apparatus of claim 10, wherein the data managing processor is further configured to update properties of the result of the ray tracing of the determined ray that is stored in the traversal (TRV) cache or the intersection test (IST) cache based on the ray tracing of the input ray.

14. The apparatus of claim 10, wherein:
the ray scanning processor is further configured to extract a viewpoint and a direction of the input ray, and
the data managing processor is further configured to compare a viewpoint or a direction of the input ray and a viewpoint or a direction of the rays used in previous renderings to determine a ray having a viewpoint and a direction closest to the viewpoint and the direction of the input ray.

15. The apparatus of claim 10, wherein the data manager is further configured to store the result of the ray tracing stored in the traversal (TRV) cache or the intersection test (IST) cache to a preliminary cache.

16. The apparatus of claim 10, wherein the data manager is further configured to control an order of traversal of the acceleration structure based on the ray tracing of the determined ray.

17. The apparatus of claim 10, wherein the data manager is further configured to control an order of an intersection test based on the ray tracing of the determined ray.

18. A method of ray tracing, the method comprising:
extracting characteristics of sequentially input rays at a hardware ray scanner, wherein the extracting comprises loading data of a primitive from a memory in response to the data not being stored in a TRV cache or a IST cache, and wherein the data of the primitive comprises information of a vertex and a position;
determining groups of the rays based on the characteristics via comparing with a previous rendering of a previous image using a hardware data manager;
updating a processing order of the input rays based on a group of the groups;
updating a flag of the TRV cache so that a result of the ray tracing of the determined ray is maintained to indicate that the result is not deleted in the respective TRV cache when the result of the ray tracing of the determined previous ray is stored in the TRV cache and updating a flag of the IST cache so that a result of the ray tracing of the determined ray is maintained to indicate that the result is not deleted in the respective TRV cache when the result of the ray tracing of the determined previous ray is stored in the IST cache; and
loading the result of the ray tracing of the determined ray to the respective TRV cache or the IST cache, in response to a result of the ray tracing of the determined ray not being stored in the respective TRV cache or the IST cache.

19. The method of claim 18, wherein the determining of the groups comprises determining the groups based on the rays having a viewpoint or a direction within a range.

20. The method of claim 18, wherein the determining of the groups comprises:
determining a ray used in the previous rendering with characteristics similar to the characteristics of one of the rays based on comparing the characteristics of the one of the rays and characteristics of rays used in previous renderings; and
identifying a group for the one of the rays based on a result of a ray tracing of its determined previous ray.

21. The method of claim 20, wherein the identifying of the group comprises identifying the group for the one of the rays based on a bounding box that is hit by its determined previous ray.

22. The method of claim 18, wherein the updating of the processing order comprises updating the processing order of the input rays such that ray tracing of the rays determined to be in the same group is performed sequentially.

23. The method of claim 18, wherein the characteristics comprise at least one of a viewpoint, a direction, information indicating a pixel of an image, and a starting point of the ray.

24. A non-transitory computer-readable recording hardware medium having embodied thereon a program for executing the method of claim 18.

25. A ray tracing apparatus comprising:
a hardware ray scanner configured to extract characteristics of sequentially input rays by loading data of a primitive from a memory in response to the data not being stored in a TRV cache or a IST cache, and wherein the data of the primitive comprises information of a vertex and a position; and
a hardware data manager configured to determine groups of the rays based on characteristics of the rays via comparing with a previous rendering of a previous image, to update a processing order of the input rays based on a group of the groups, and update a flag of the TRV cache so that a result of the ray tracing of the determined ray is maintained to indicate that the result is not deleted in the respective TRV cache when the result of the ray tracing of the determined previous ray is stored in the TRV cache and update a flag of the IST cache so that a result of the ray tracing of the determined ray is maintained to indicate that the result is not deleted in the respective TRV cache when the result of the ray tracing of the determined previous ray is stored in the IST cache; and
loading the result of the ray tracing of the determined ray to the respective TRV cache or the IST cache, in response to a result of the ray tracing of the determined ray not being stored in the respective TRV cache or the IST cache.

26. The ray tracing apparatus of claim 25, wherein the hardware data manager is further configured to determine the groups of the rays based on a viewpoint or a direction of the rays being within a range.

27. The ray tracing apparatus of claim 25, wherein the hardware data manager is further configured:
to determine a ray used in previous renderings with characteristics similar to the characteristics of one of the rays based on comparing characteristics of one of the rays and characteristics of rays used in previous renderings, and
to identify a group for the one of the rays based on a result of ray tracing of its determined previous ray.

28. The ray tracing apparatus of claim 27, wherein the hardware data manager is further configured to identify the group for the one of the rays based on a bounding box that is hit by its determined previous ray.

29. The ray tracing apparatus of claim 25, wherein the hardware data manager is further configured to update a processing order of rays such that ray tracing of the rays determined to be in the same group is performed sequentially.

30. A method of ray tracing comprising:
extracting characteristics of an input ray at a ray scanner;

determining a ray with characteristics similar to that of the input ray based on comparing characteristics of the input ray with characteristics of rays used in previous renderings of previous images;
conducting a set up for ray tracing of the input ray based on a ray tracing of the determined ray by loading data of a primitive from a memory in response to the data not being stored in a TRV cache or an IST cache, wherein the data of the primitive comprises information of a vertex and a position;
updating a flag of the TRV cache and the IST cache so that a result of the ray tracing of the determined ray is maintained to indicate that the result is not deleted in the respective TRV cache or the IST cache, in response to a result of the ray tracing of the determined previous ray being stored in the respective TRV cache or the IST cache; and
loading the result of the ray tracing of the determined ray to the respective TRV cache or the IST cache, in response to a result of the ray tracing of the determined ray not being stored in the respective TRV cache or the IST cache.

* * * * *